(12) United States Patent
Moniwa et al.

(10) Patent No.: US 8,394,267 B2
(45) Date of Patent: Mar. 12, 2013

(54) WATER TREATMENT EQUIPMENT FOR RECOVERING PHOSPHORUS FROM WATER

(75) Inventors: Shinobu Moniwa, Kawasaki (JP); Hidetake Shiire, Tokyo (JP); Satomi Ebihara, Tokyo (JP); Masahiko Tsutsumi, Fuchu (JP); Nobuyuki Ashikaga, Kawasaki (JP); Satoshi Haraguchi, Kodaira (JP); Akiko Suzuki, Tokyo (JP); Hideyuki Tsuji, Yokohama (JP); Tatsuoki Kohno, Tokyo (JP); Kazuhiko Noda, Hino (JP); Katsuya Yamamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 259 days.

(21) Appl. No.: 12/789,947

(22) Filed: May 28, 2010

(65) Prior Publication Data
US 2010/0300949 A1 Dec. 2, 2010

(30) Foreign Application Priority Data
May 29, 2009 (JP) ................. 2009-131568

(51) Int. Cl.
C02F 1/28 (2006.01)
(52) U.S. Cl. ........ 210/190; 210/191; 210/207; 210/269; 210/275; 210/277; 210/436; 210/502.1; 210/906
(58) Field of Classification Search ................. 210/190, 210/191, 207, 269, 275, 277, 436, 502.1, 210/906
See application file for complete search history.

(56) References Cited

U.S. PATENT DOCUMENTS

| 4,477,355 | A | * | 10/1984 | Liberti et al. ................. 210/665 |
| 6,136,199 | A | * | 10/2000 | SenGupta et al. ............ 210/670 |
| 7,588,744 | B1 | * | 9/2009 | Sylvester ...................... 423/299 |
| 2009/0048103 | A1 | | 2/2009 | Suzuki et al. |
| 2009/0238746 | A1 | | 9/2009 | Shiire et al. |

FOREIGN PATENT DOCUMENTS

| JP | 2002-370086 A | 12/2002 |
| JP | 2008-264661 | 11/2008 |
| JP | 2009-56457 | 3/2009 |
| JP | 2009-226250 | 10/2009 |
| WO | WO 9003947 A * | 4/1990 |
| WO | WO 2010/143383 A1 | 12/2010 |

OTHER PUBLICATIONS

Moniwa et al., U.S. Appl. No. 12/790,087, filed May 28, 2010.

(Continued)

Primary Examiner — Matthew O Savage
(74) Attorney, Agent, or Firm — Finnegan, Henderson, Farabow, Garrett & Dunner, L.L.P.

(57) ABSTRACT

According to one embodiment, in order to eliminate impurities, and the like, water to be treated is passed through each of reactor vessels, phosphorus contained in the water to be treated is removed by using an adsorbent, and thereafter the liquid held in each of the reactor vessels is discharged through each of first to third treated water discharge paths, thereby eliminating the impurities, and the like derived from the water to be treated. It is possible to eliminate the influence of the impurities in the water to be treated on the discharged desorption agent liquid containing phosphorus from the phosphorus adsorbent can be eliminated, and hence it is possible to obtain a phosphorus-containing liquid containing no substance other than the recovered phosphoric matter material.

6 Claims, 2 Drawing Sheets

OTHER PUBLICATIONS

Notification of the First Office Action mailed Feb. 13, 2012, from the State Intellectual Property Office of the People's Republic of China, in corresponding Chinese Patent Application No. 201010193404.9, along with English translation (11 pages total).

* cited by examiner

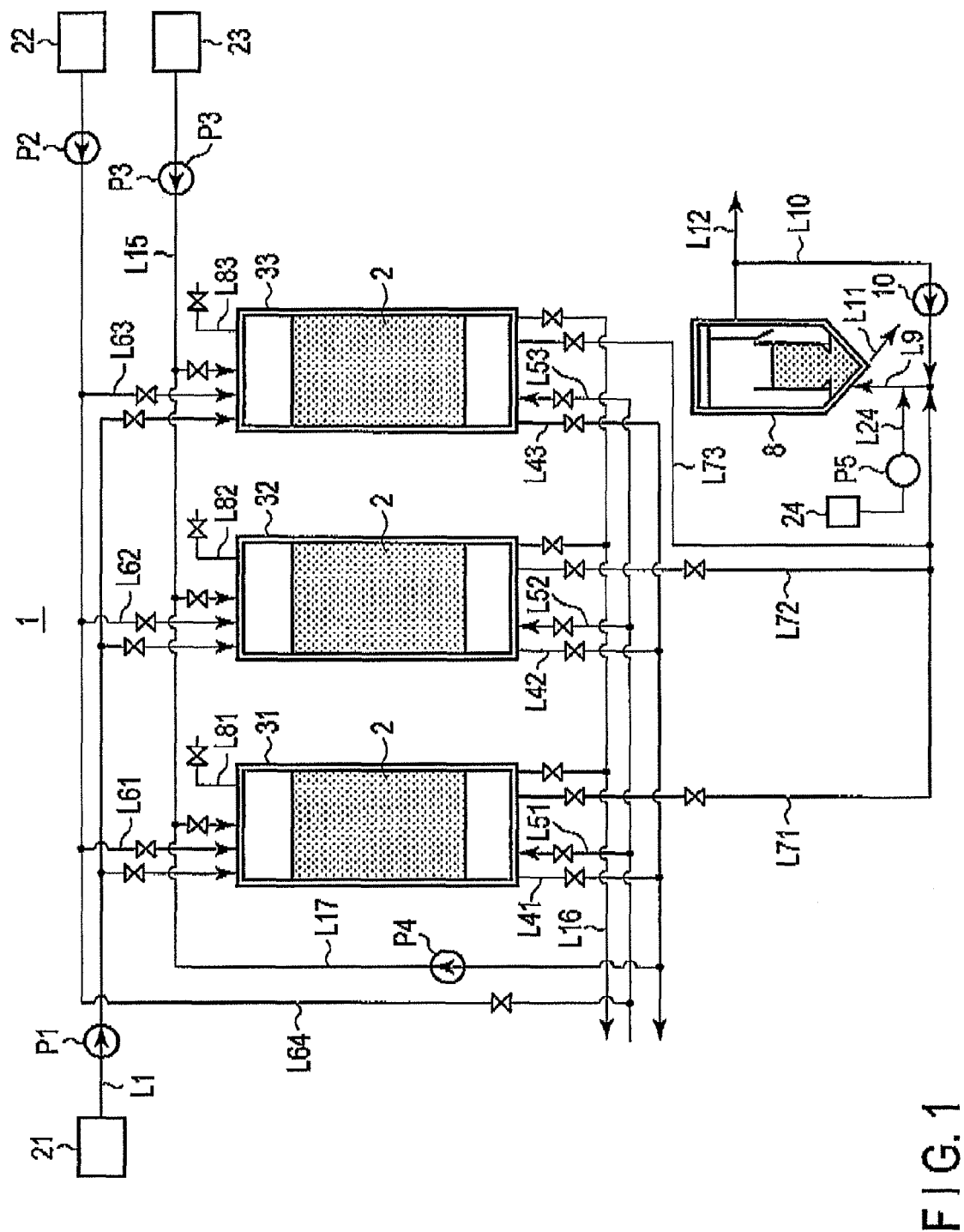
F I G. 1

WATER TREATMENT EQUIPMENT FOR RECOVERING PHOSPHORUS FROM WATER

CROSS-REFERENCE TO RELATED APPLICATIONS

This application is based upon and claims the benefit of priority from Japanese Patent Application No. 2009-131568, filed May 29, 2009; the entire contents of which are incorporated herein by reference.

FIELD

Embodiments described herein relate generally to a water treatment equipment configured to recover phosphorus contained in the wastewater to be treated, and more particularly, to a water treatment equipment configured to treat the water discharged from a treatment process of excess sludge discharged from biological wastewater treatment such as an activated sludge process, and the like used for industrial wastewater treatment such as sewerage, a food-processing plant, and the like, and still more particularly, to a water treatment equipment configured to recover/recycle phosphorus contained in the wastewater to be treated.

BACKGROUND

At present, future worldwide phosphorus resources exhaustion is predicted, and from the domestic conditions that securement of phosphorus resources is dependent on importation, attention is paid to the technique for recovering phosphorus contained in the wastewater.

Heretofore, as for phosphorus in the wastewater, discharge of phosphorus into the environment system is a factor of eutrophication, hence removal of phosphorus and discharge state management thereof have been regarded as indispensable, and thus efforts have been concentrated mostly on the phosphorus removing technique. As representative phosphorus removing techniques, there are the biological phosphorus removing method utilizing phosphorus-accumulation capability of microorganism, and phosphorus removing method based on the coagulating sedimentation.

In order to use these phosphorus removing methods as direct phosphorus recovery/utilization means, for example, processes of incineration, chemical treatment, and the like of excess sludge resulting from the biological phosphorus removing method have been required, and it has been necessary to use a large amount of chemical agents, and arrange a plurality of treatment processes. For example, in order to reuse the phosphorus as resources, it is also necessary to eliminate influences of the used chemical agents and impurities contained in the derived sludge, and hence adjustment and refinement processes of the phosphorus also become necessary. In view of these circumstances, attention is paid to a water treatment technique utilizing a phosphorus adsorbent configured to selectively adsorb phosphorus. Examples of a material used to selectively remove an anion include a phosphorus adsorbent in which an anion-exchange resin or hydrotalcite-like inorganic layered compound is basically used as an anion exchanger, and adsorbent in which various metals are basically used as an anion exchanger. Regarding methods of manufacturing these adsorbents, a phosphorus adsorbent formed by developing the material characteristics of the above adsorbents, and phosphorus recovery utilizing the phosphorus adsorbent, a large number of methods are proposed.

As an example of a phosphorus recovery system utilizing these adsorbents, there is a system disclosed in JP-A 2008-264661 (KOKAI).

In JP-A 2008-264661 (KOKAI), a method is described in which in order to prevent the consumption of the chemical agent serving as the water passing liquid from increasing, the wastewater to be treated is made to flow through a reaction vessel filled with a phosphorus adsorbent, thereafter a chemical agent is poured into the vessel for a while, and thereafter the adsorbent is immersed in the stationary chemical agent, whereby the phosphorus that has been adsorbed is desorbed, and a liquid remaining in the container is discharged in advance by supplying a gaseous body into the container before passing the chemical agent and the like.

However, in the wastewater treatment described in JP-A 2008-264661 (KOKAI), there is the possibility of the amount of the passed liquid being prevented from increasing, whereas there is the possibility of the desorption being not completely advanced between the adsorbent and chemical agent containing phosphorus concomitantly with an increase in the concentration of the phosphorus desorbed from the adsorbent by the immersion of the adsorbent in the desorption chemical agent. Accordingly, by the method disclosed in JP-A 2008-264661 (KOKAI), when the adsorption operation is repetitively carried out, a sufficient actual adsorption capacity cannot be obtained in spite of the adsorption capacity originally possessed by the phosphorus adsorbent. As a result of this, there are the problem of an increase in the used amount of the adsorbent, and problem that upsizing of the equipment is brought about. Further, there is the problem that when the liquid is reintroduced into the adsorbent by discharging the liquid from the reaction container of the adsorbent by the introduction of the gaseous body, the gaseous body remains in the container, and contact of the liquid to be introduced in the subsequent process with the adsorbent is obstructed by the remaining gaseous body, whereby lowering of the efficiency of adsorption of phosphorus by the introduction of the wastewater to be treated, and efficiency of discharge of the phosphorus by the introduction of the chemical agent is caused.

Further, as another problem, there is the problem that in the phosphorus removal of the wastewater containing phosphorus, when an alkaline liquid serving as a chemical agent liquid for desorbing the phosphorus captured by the phosphorus adsorbent is made to flow in a circulating manner, there is the possibility of the desorption being not completely advanced between the phosphorus adsorbent and chemical agent liquid containing phosphorus concomitantly with an increase in the concentration of the phosphorus in the chemical agent liquid, and hence when the adsorption operation is repetitively carried out, a sufficient actual adsorption capacity cannot be obtained in spite of the adsorption capacity originally possessed by the phosphorus adsorbent, and consequently, the used amount of the adsorbent is increased, and upsizing of the equipment is caused.

At this time, regarding the impurities contained in the wastewater to be treated containing phosphorus, after the phosphorus is adsorbed and removed, the alkaline liquid for desorbing the phosphor is passed through the wastewater, thus the impurities contained in the wastewater to be treated are mixed into the alkaline liquid for desorbing the phosphorus in addition to the phosphorus desorbed by the alkaline liquid and moved to the alkaline liquid which has been passed through the wastewater, and hence there is the problem that the impurities are mixed into the phosphorus recovery liquid.

Embodiments have been contrived to solve the problems described above, and an object thereof is to provide a water treatment equipment configured to recover phosphorus, in which the sludge-separated liquid discharged from a treatment process of sludge discharged from a biological water treatment process is made the water to be treated, phosphorus contained in the water to be treated is separated from the water by using an adsorbent, and which is capable of efficiently carrying out an operation of bringing the water to be treated with an agent liquid while preventing the impurities in the water to be treated from being mixed into the recovered phosphorus.

In general, according to one embodiment, a water treatment equipment comprises a phosphorus adsorbent which adsorbs phosphorus contained in water to be treated; a reactor vessel filled with the phosphorus adsorbent; an introduction path configured to introduce the water into the reactor vessel, and a discharge path configured to discharge, from the reactor vessel, the water from which phosphorus has been removed; a first liquid passing mechanism configured to pass, through the reactor vessel, a phosphorus desorption agent liquid which desorbs phosphorus from the phosphorus adsorbent which has adsorbed phosphorus; a phosphorus recovery mechanism configured to recover phosphate from the phosphorus desorption agent liquid which has been subjected to the passing treatment; a second liquid passing mechanism configured to pass and circulate, through the reactor vessel, a regeneration agent liquid which generates the phosphorus adsorbent; and a discharge mechanism configured to discharge the liquid held in the reactor vessel after passing the water or the phosphorus desorption agent liquid through the reactor vessel.

BRIEF DESCRIPTION OF THE DRAWINGS

FIG. 1 is a configuration block diagram of a water treatment equipment according to a first embodiment.

DETAILED DESCRIPTION

Figure 2:
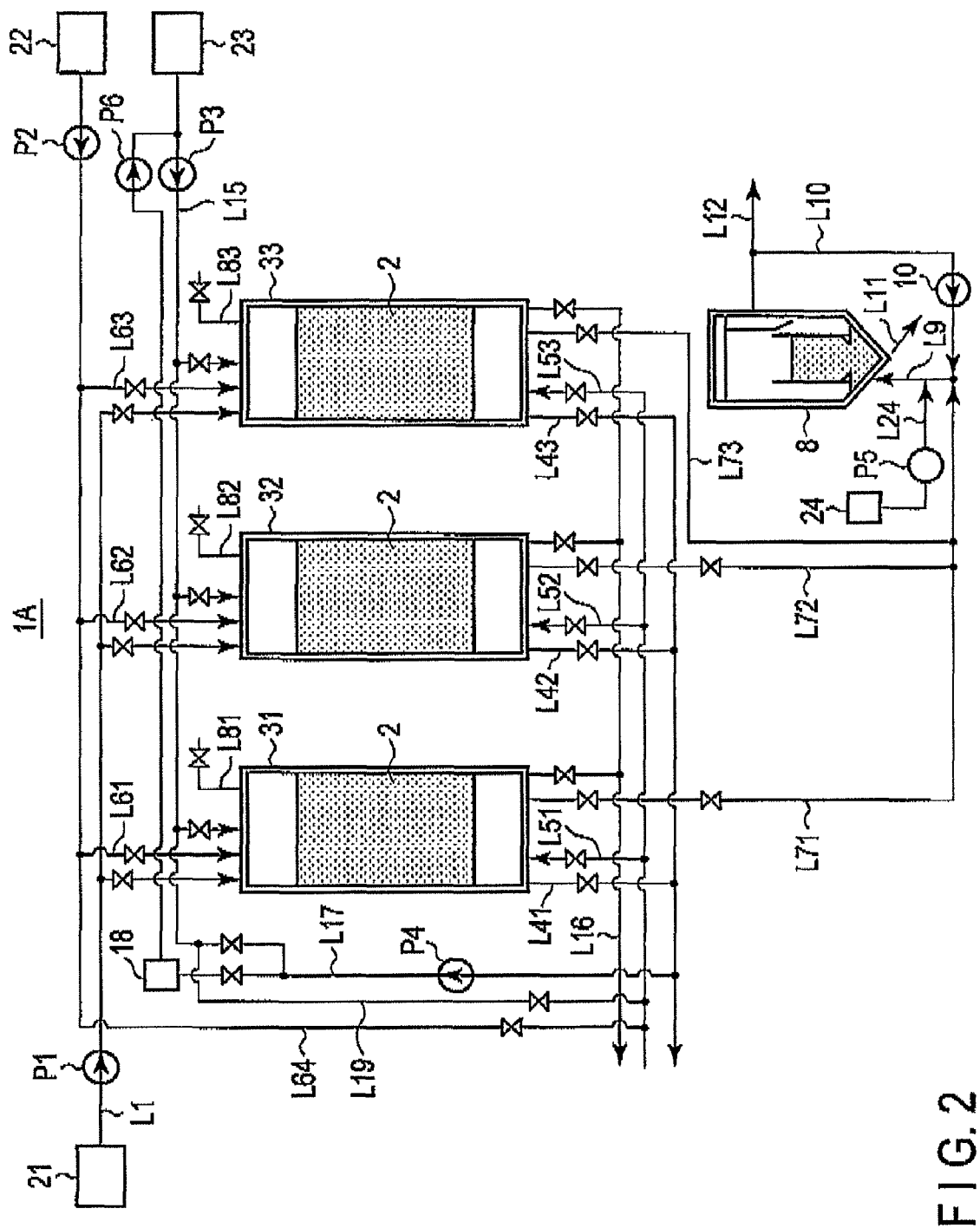
FIG. 2 is a configuration block diagram of a water treatment equipment according to a second embodiment.

In general, according to one embodiment, certain embodiments will be described below with reference to the accompanying drawings.

First Embodiment

A water treatment equipment of a first embodiment will be described below with reference to FIG. 1.

The water treatment equipment 1 of this embodiment is applied to a water treatment equipment of a sludge-separated liquid discharged from a treatment process of excess sludge discharge from biological wastewater treatment such as an activated sludge process, and the like used for industrial wastewater treatment such as sewerage, a food-processing plant, and the like, and more particularly, to a water treatment equipment including a biological wastewater treatment process provided with a path for return to the biological water treatment process upstream side from which the sludge is derived.

The water to be treated is derived from the sludge-separated liquid obtained in the treatment process of the excess sludge. The treatment process of the excess sludge mentioned here includes all of a sludge concentration process, sludge dehydration process, and anaerobic digestion treatment. That is, the water to be treated is a mixture constituted of one or two or more of the sludge-separated liquid obtained from the sludge concentration process, sludge-separated liquid obtained from the sludge dehydration process, and sludge-separated liquid obtained from the anaerobic digestion treatment. Further, when applied to the sludge treatment process of the sewage treatment, the water to be treated is stable in the drainage water quantity and water quality, and hence can contribute to planned phosphorus recovery. The water to be treated is introduced into each of a first reactor vessel 31, second reactor vessel 32, and third reactor vessel 33 by the drive of a pump P1 through a path L1 from a raw water supply source 21. Each of the first to third reactor vessels 31 to 33 includes a packed bed 2 filled with an adsorbent.

Here, it is desirable that the phosphorus adsorbent be selected from materials in which an organic metal complex shown in, for example, JP-A 2009-56457 (KOKAI) is employed as a base, capable of repetitively carrying out adsorption/desorption of phosphorus in a chemically reversible manner, having a wide range of selectivity of a desorption liquid used for desorption of phosphorus from the adsorbent after the adsorption of the phosphorus in the wastewater, and further capable of selectively adsorbing phosphorus. An example of the phosphorus adsorbent is a phosphorus adsorbent including a nitrogen-containing compound which is a high polymer (also including only a single amino group) and has one or two or more amino groups at an end of the structure, carrier carrying the above nitrogen-containing compound, and at least one metallic ion selected from a group constituted of a zinc ion, copper ion, ferric ion, and zirconium ion, and fixed to the nitrogen-containing compound. As the carrier, it is possible to use silica gel, alumina, glass, kaolin, mica, talc, clay, hydrated alumina, wollastonite, iron powder, potassium titanate, titanium oxide, zinc oxide, silicon carbide, silicon nitride, calcium carbonate, carbon, barium sulfate, boron, ferrite, and the like. The first to third reactor vessels 31 to 33 are operated in the fixed-bed state when the water to be treated is introduced into them. Further, in order to continuously remove phosphorus contained in the water to be treated, it is desirable that the first to third reactor vessels 31 to 33 be used in such a manner that while the water to be treated is flowing through one or two of the first to third reactor vessels 31 to 33, a water-passing operation other than the passing operation of the water to be treated (for example, a reverse cleaning operation) is carried out in the other remaining vessels or vessel.

The water to be treated is introduced into any one of the first to third reactor vessels 31 to 33, phosphorus contained in the water is removed by using a phosphorus adsorbent, and the water is thereafter discharged from each of the first to third reactor vessels 31 to 33 through each of first to third treated water discharge paths L41 to L43. The water to be treated is introduced into the first to third reactor vessels 31 to 33 from the raw water supply source 21 through the path L1 by the drive of the pump P1, and the adsorbent in the packed bed 2 is caused to adsorb the phosphorus contained in the water to be treated. As for the adsorbent which has adsorbed the phosphorus, passing of the water to be treated is stopped, and thereafter the liquid held in each of the first to third reactor vessels 31 to 33 is discharged through any one of the first to third treated water discharge paths L41 to L43 respectively communicated with the first to third reactor vessels 31 to 33. Vent paths L81 to L83 are provided at upper parts of the first to third reactor vessels 31 to 33, and hence the internal gas is discharged from each of the reactor vessels 31 to 33 through each of the vent paths L81 to L83, whereby discharge of the water to be treated from each of the reactor vessels 31 to 33 is promoted.

After the discharging of the liquid which has been held in each of the first to third reactor vessels 31 to 33 is completed, when the liquid is introduced into a lower part of each of the first to third reactor vessels 31 to 33 from each of first to third liquid introduction paths L51, L52, and L53, the introduced liquid is brought into contact with the phosphorus adsorbent of the packed bed 2. Here, the liquid introduced into the lower part of each of the first to third reactor vessels 31 to 33 through each of the liquid introduction paths L51, L52, and L53 causes neither deterioration in quality of the phosphorus adsorbent nor corrosion of the structural material of the water treatment equipment, contains an ingredient having capability of being adsorbed into the phosphorus adsorbent, and contains neither an ion component nor solid contents adversely affecting the subsequent processes. Here, it is also possible to use a liquid containing the agent ingredient to be introduced through each of first to third desorption agent liquid introduction paths L61 to L63. Further, when there is the possibility of the impurities contained in the water to be treated to be passed through the first to third reactor vessels 31 to 33 being accumulated in the phosphorus adsorbent, it is also possible to subject the adsorbent of the packed bed 2 to reverse cleaning by using the liquid to be introduced through each of the first to third reactor vessel liquid introduction paths.

A desorption agent liquid supply source 22 is connected to each of the first to third reactor vessels 31 to 33 through each of three branch paths L61 to L63. A common path from the desorption agent liquid supply source 22 to the first to third reactor vessels 31 to 33 is furnished with a pump P2.

The liquid is introduced into each of the first to third reactor vessels 31 to 33 through each of the liquid introduction paths L51 to L53, the adsorbent adsorbs phosphorus contained in the water to be treated, and thereafter the desorption agent liquid is introduced from the agent liquid supply source 22 into each of the first to third reactor vessels 31 to 33 through each of the first to third desorption agent liquid introduction paths L61 to L63 by the drive of the pump P2. The phosphorus is desorbed from the phosphorus adsorbent by the desorption agent liquid. Further, the liquid containing the phosphorus derived from the water to be treated, and ingredient derived from the desorption agent liquid is discharged from each of the first to third reactor vessels 31 to 33 through each of first to third desorption agent liquid passing treatment water discharge paths L71 to L73. Here, it is desirable that the agent liquid to be introduced through each of the agent liquid introduction paths L61 to L63 be selected from ingredients having little effect on the characteristics of the adsorbent, equipment structure constituting the equipment, and crystallized phosphoric material, and it is possible to use an ingredient exhibiting alkalinity such as aqueous sodium hydroxide, dilute hydrochloric acid, and the like. From the view point of purity maintenance of the crystallized phosphate matter of the agent liquid, it is particularly desirable that aqueous sodium hydroxide be used.

The phosphorus-containing liquid to be discharged from each of the first to third desorption agent liquid passing treatment water discharge paths L71 to L73 is introduced into a crystallization vessel 8. In the crystallization vessel 8, introduction of a crystallization agent liquid, and an agitation mixing operation using a stirrer 10 are carried out. As for the crystallization agent liquid mentioned here, it is desirable that an ingredient such as calcium compound or the like which forms a solid compound in cooperation with phosphorus be added, and it is more desirable that calcium hydroxide be used. Here, although the calcium hydroxide may be in the form of each of an aqueous solution and micronized fine powder slurry liquid, it is more desirable that the calcium hydroxide be introduced in the form of the aqueous solution.

A path L9 is communicated with a lower part of the crystallization vessel 8. To this path L9, an agent liquid injection path L24 is connected, and circulation path L10 is further connected. The agent liquid injection path L24 is furnished with a pump P5, and the crystallization agent liquid is injected from a crystallization agent liquid supply source 24 into the crystallization vessel 8 by the drive of the pump P5. The circulation path L10 is furnished with the stirrer 10, and the liquid discharged from the crystallization vessel 8 is agitated/mixed by the stirrer 10. The agitated/mixed liquid is returned to the inside of the crystallization vessel 8 through the path L9. It should be noted that the discharge path from the crystallization vessel 8 is branched into the circulation path L10 and discharge path L12. The discharge path L12 is communicated to a storage tank (not shown).

The stirrer 10 is used for agitation mixing inside the crystallization vessel 8, agitation stirring to be carried out by introduction of a gaseous body including an inert gas, and the like in addition to agitation stirring to be carried out by liquid circulation. At this time, in the case of the agitation stirring to be carried out by the introduction of the gaseous body, it is desirable that no gas component adversely affecting the production of the phosphate obtained in the crystallization vessel 8 be contained in the gaseous body.

Further, it is desirable that the phosphate be obtained in a state where a solid body of the targeted recovered phosphate is present in the crystallization vessel 8, and when the recovered phosphate is hydroxyapatite, it is desirable that a seed crystal of the hydroxyapatite be previously supplied or continuously supplied. The two supply means may be combined with each other, and it is also possible to use the solid body of the phosphate produced in the crystallization vessel 8. It should be noted that the crystallization vessel 8 may also be a single vessel into which a solid-liquid separation function of the crystallized matter is incorporated, or solid-liquid separation means may be added separately from the crystallization vessel 8, or the crystallization vessel 8 may be configured to be adapted to multistage processing.

A regeneration agent liquid supply source 23 is connected to each of the first to third reactor vessels 31 to 33 through a regeneration agent liquid introduction path L15. The path 15 is furnished with a pump P3. Further, the first to third treated water discharge paths L41 to L43 are communicated with a regeneration agent liquid circulation path L17. The path L17 is furnished with a pump P4. The regeneration agent liquid circulation path L17 is connected to the upper part of each of the first to third reactor vessels 31 to 33.

After completion of the introduction of the agent liquid from each of the first to third desorption agent liquid introduction paths L61 to L63, in order to carry out regeneration agent liquid treatment configured to bring the adsorbent into a state where the adsorbent is more suitable for phosphorus adsorption, the regeneration agent liquid is introduced from the regeneration agent liquid introduction path L15 into any one of the first to third reactor vessels 31 to 33. This regeneration agent liquid is reintroduced, after being discharged from a regeneration agent liquid treatment water discharge path L16, into a reactor vessel for regeneration agent liquid introduction of any one of the first to third reactor vessels 31 to 33 through the regeneration agent liquid circulation path L17 by the drive of the pump P4. It is desirable that an agent liquid which can be easily substituted for the phosphorus adsorbing part of the phosphorus adsorbent, and is derived from an inexpensive material be introduced as this regeneration agent liquid, and it is possible to use, for example, an aqueous solution of sodium chloride or the like. In this regeneration agent liquid, in order to bring the adsorbent into a state where the adsorbent is more suitable for phosphorus adsorption as compared with the desorption agent liquid, it is desirable that a liquid of high salt concentration be used as the regeneration agent liquid.

Next, the function and advantage of the equipment 1 of this embodiment will be described below.

The water to be treated is a desorbed liquid discharged by the solid-liquid separation operation of the sludge, and contains therein impurities such as suspended solids, and the like. Accordingly, in the process using an adsorbent, there is the possibility of the suspended solids being accumulated in the adsorbent layer, and contamination of the adsorbent being caused. Further, in the adsorbent in which an operation of desorption from the adsorbent to be carried out by the introduction of the agent liquid is employed, and which is repetitively used, there is the possibility of the ingredients contained in the water to be treated being mixed into the process of the subsequent stage. Accordingly, a water treatment equipment which can eliminate impurities such as SS, and the like contained in the water to be treated, and in which the adsorbent can be repetitively utilized is required by the users. Further, due to the influence of the reactor vessel-retained liquid derived from the water to be treated, there is the possibility of the performance of the desorption agent liquid being deteriorated, and consequently, there is the possibility of the agent liquid used amount being increased.

Thus, in the equipment 1 of this embodiment, in order to eliminate the impurities, and the like from the water to be treated, first, the water to be treated is passed through each of the first to third reactor vessels 31 to 33, phosphorus contained in the water to be treated is removed by the adsorbent of the packed bed 2, thereafter the liquid held in each of the first to third reactor vessels 31 to 33 is discharged through each of the first to third treated water discharge paths L41 to L43, and the impurities, and the like derived from the water to be treated are eliminated. As a result of this, it is possible to eliminate the influence of the impurities in the water to be treated 1 on the desorption agent liquid containing phosphorus from the phosphorus adsorbent, discharged from each of the first to third desorption agent liquid passing treatment water discharge paths L71 to L73 to be thereafter introduced into the crystallization vessel 8, and hence it is possible to obtain a phosphorus-containing liquid containing no substance other than the targeted recovered phosphoric matter material.

Further, in the case where the suspended solids impurities, and the like contained in the water to be treated are accumulated in the phosphorus adsorbent of the packed bed 2 when the water is passed through each of the first to third reactor vessels 31 to 33, it is also possible to carry out a reverse cleaning operation by using the liquid to be thereafter introduced through each of the first to third reactor vessel liquid introduction paths L51 to L53. The suspended solids are eliminated by the reverse cleaning operation, and it is possible to eliminate the influence of the suspended solids in the water to be treated on the desorption agent liquid containing phosphorus from the phosphorus adsorbent, discharged from each of the first to third desorption agent liquid passing treatment water discharge paths L71 to L73, and thereafter introduced into the crystallization vessel 8. Further, after the liquid held in the reactor vessel is discharged, by supplying the liquid as an upward flow, it is possible to quickly eliminate the gaseous phase accumulated in the adsorbent packed bed 2, and hence it is possible to soundly maintain the contact between the phosphorus adsorbent and agent liquid at the time of the agent liquid passing to be thereafter carried out, and prevent the agent liquid used amount from being increased. It should be noted that it is possible to connect the first to third reactor vessel liquid introduction paths L71 to L73 to the path L9 arranged at the lower part of the crystallization vessel 8.

It is also possible to utilize the desorption agent liquid as the liquid to be introduced as the upward flow, and it is further possible to prevent the agent liquid used amount from being increased by preventing the dilution from being effected by the liquid held by each of the first to third reactor vessels 31 to 33 when the phosphorus is desorbed from the phosphorus adsorbent of the packed bed 2. In addition to the impurities elimination operation, and agent liquid used amount prevention operation, by always retaining the seed crystal of the phosphate targeted in the crystallization vessel 8, it is possible to make it easy to maintain the configuration of the recovered phosphoric material, and by injecting, for example, a substance derived from calcium compound as the compound which is the material of the phosphate as the need arises, it is possible to carry out phosphorus recovery in which the agent liquid used amount is prevented from being increased.

Further, the regeneration agent liquid to be introduced through the path L15 is a liquid having higher salt concentration than the desorption agent liquid, and hence after passing of the desorption agent liquid, and before passing of the regeneration agent liquid, the desorption agent liquid held by each of the first to third reactor vessels 31 to 33 is discharged from each of the vessels 31 to 33, and thereafter the regeneration agent liquid is introduced into each of the vessel 31 to 33, whereby it is possible to carry out regeneration agent liquid treatment in which the influence of the desorption agent liquid held by each of the first to third reactor vessels 31 to 33 is prevented from being exerted on the regeneration agent liquid treatment. Further, by the circulation operation through the regeneration agent circulation path L17, it is possible to reduce the consumption amount of the regeneration agent liquid.

As described above, in the water treatment equipment of the embodiment, the water to be treated containing phosphorus is introduced into the reactor vessel filled with the phosphorus adsorbent, phosphorus is captured in the phosphorus adsorbent, thereafter the treated water which has adsorbed phosphorus including impurities derived from the water to be treated is discharged by the means for discharging the liquid held by the reactor vessel through the discharge path of the treated water which is held by the reactor vessel and from which phosphorus has already been removed, and hence it is possible to reduce the concentration of the impurities held in the reactor vessel in which the phosphorus adsorbent that has adsorbed phosphorus is retained.

Further, by introducing the liquid into the reactor vessel in which the adsorbent that has adsorbed phosphorus is retained as an upward flow, it is possible to eliminate the gaseous phase remaining in the adsorbent packed bed in the reactor vessel, and the contact between the phosphorus desorption agent liquid to be thereafter introduced into the reactor vessel, and the phosphorus desorption agent liquid at the water passing means is made uniform, and hence it is possible to efficiently desorb the phosphorus captured in the phosphorus adsorbent therefrom.

Further, by using the liquid to be supplied as the upward flow as the desorption agent liquid, the phosphorus desorption agent liquid is brought into contact with the adsorbent with the ingredients of the phosphorus desorption agent liquid being not diluted by the liquid held by the reactor vessel, and hence it is possible to carry out utilization of the water treatment equipment in which the agent liquid consumption is prevented from excessively increasing.

In the phosphorus recovery to be carried out by the crystallization means for acquiring the phosphate of the passing treatment water of the phosphorus desorption agent liquid, by making the passing treatment water of the phosphorus desorption agent liquid which contains little impurities, and is stable the water to be treated, it is possible to carry out supply of impurities to the crystallization mechanism configured to acquire the phosphate which is the recovered phosphoric matter, prevent the phosphorus concentration of the discharged liquid from being lowered, and appropriately carry out phosphorus recovery from the wastewater.

Further, the phosphorus desorption agent liquid finally becomes the water to be treated of the phosphorus crystallization mechanism in the crystallization mechanism for recovering the phosphate, and hence, depending on the configuration of the recovered phosphate of the phosphorus, it is desirable that the phosphorus desorption agent liquid be selected from agent liquids capable of desorbing phosphorus, and having little influence on the phosphate crystallization. When the phosphorus adsorptive capability of the phosphorus adsorbent is not restored to the predetermined state by only using the phosphorus desorption agent liquid, it is possible to repetitively use the phosphorus adsorbent for the phosphorus removal/recovery from the wastewater by separately passing a regeneration agent liquid of the phosphorus adsorbent.

Furthermore, by bringing the calcium phosphate salt which is the phosphate obtained from the passing treatment water of the phosphorus desorption agent liquid, and passing treatment water into contact with each other, and providing agent injection mechanism derived from solid or liquid calcium salt, it is possible to efficiently recover phosphorus while preventing the crystal of the by-product from growing, and preventing the agent liquid consumption amount from increasing by the means for introducing the phosphate from the source thereof as the need arises.

As the advantage of applying the water treatment equipment 1 of this embodiment to the wastewater discharged from the treatment process of the excess sludge, the sludge-separated liquid discharged from the treatment process is normally returned to the upstream side of the biological wastewater treatment process from which the sludge is derived. As a result of this, by the embodiment having an object as the water treatment equipment configured to recycle phosphorus, it is possible to reduce the risk of water contamination concomitant with the variation in the phosphorus concentration in the effluent discharged from the overall treatment system to the outside of the system as compared with the case where the water treatment equipment is applied to the inflow water to the overall treatment system or to the outflow water part from the overall treatment system.

According to the water treatment equipment 1 of this embodiment, it becomes possible to reduce the consumption amount of the agent liquid, and carry out phosphorus removal and phosphorus recovery by repetitively utilizing the phosphorus adsorbent while eliminating the influence of the impurities contained in the water to be treated, and hence it is possible to efficiently and appropriately carry out the operation of recovering phosphorus from the wastewater.

Second Embodiment

Next, an equipment of a second embodiment will be described below with reference to FIG. 2. It should be noted that a description of parts of this embodiment overlapping the embodiment described previously will be omitted.

In a water treatment equipment 1A of this embodiment, a regeneration agent liquid circulation storage tank 18, regeneration agent liquid introduction auxiliary path L19, and circulation pump P6 are additionally provided in the part of the equipment 1A corresponding to the equipment 1 of the first embodiment. The regeneration agent liquid circulation storage tank 18 is provided in a regeneration agent liquid circulation path L17. The circulation pump P6 is provided in the path L17 on the downstream side of the regeneration agent liquid circulation storage tank 18.

Further, the regeneration agent liquid introduction auxiliary path L19 is connected to the downstream side of a regeneration agent liquid introduction path L15. Furthermore, the auxiliary path L19 is connected to each of first to third reactor vessel liquid introduction paths L51 to L53.

In the water treatment equipment 1A of this embodiment, as the supply source of the first to third reactor vessel liquid introduction paths L51 to L53 which are liquid supply paths of the upward flow to the first to third reactor vessels 31 to 33, it is possible to arbitrarily select a liquid to be introduced in order to eliminate the gaseous phase in the reactor vessel after the liquid held in each of the first to third reactor vessels 31 to 33 immediately after the passing of the desorption agent liquid is discharged. At this time, by providing the regeneration agent liquid introduction auxiliary path L19 in which the regeneration agent liquid is used, gas-liquid displacement is carried out by the regeneration agent liquid.

Further, the discharged liquid obtained when the regeneration agent liquid is discharged from each of the first to third reactor vessels 31 to 33 after the passing of the regeneration agent liquid through each of the first to third reactor vessels 31 to 33 carried out through the regeneration agent liquid introduction path L15, regeneration agent liquid treatment water discharge path L16, and regeneration agent liquid circulation path L17 is temporarily kept in the regeneration agent liquid circulation storage tank 18.

Next, the function and advantage of the equipment 1A of this embodiment will be described below.

Gas-liquid displacement can be carried out so that the gaseous phase may not remain in the phosphorus adsorbent packed bed 2 after the desorption agent liquid is discharged by supplying the liquid to any one of the first to third reactor vessels 31 to 33 by the upward flow before the regeneration agent liquid is introduced through the path L15, hence it is possible to soundly maintain the solid-liquid contact between the regeneration agent liquid to be thereafter passed, and phosphorus adsorbent, and hence it is possible to maintain the effect of the regeneration agent liquid passing. Further, the liquid to be introduced as the upward flow is made the regeneration agent liquid to be introduced through the auxiliary path L19, whereby it is possible to carry out regeneration agent liquid treatment in which the influence of the liquid held in each of the first to third reactor vessels 31 to 33 is prevented from being exerted on the treatment, and hence it is possible to make it easy to maintain the agent liquid effect. Furthermore, when the regeneration agent liquid held in each of the first to third reactor vessels 31 to 33 is discharged before the process is switched to the passing of the water to be treated after the passing of the regeneration agent liquid through the regeneration agent liquid introduction path L15, the discharged liquid is collected by the regeneration agent liquid circulation storage tank 18, whereby it is possible to prevent the consumption amount of the regeneration agent liquid having higher salt concentration than the desorption agent liquid from excessively increasing.

The adsorbent regeneration agent liquid is selected from agent liquid ingredients having objects of acquiring a recovered phosphoric matter by the crystallization means, and desorbing phosphorus, is passed hence when it is difficult for the phosphorus adsorbent to remove phosphorus from the water to be treated by only using the agent liquid, and is not used to desorb the phosphorus ingredient. By passing the regeneration agent liquid in a circulating manner, and carrying out the processing of circulating/reusing the overall phosphorus adsorbent, it is possible to carry out the treatment in which the agent liquid consumption amount is controlled, and maintain both the performance of the phosphorus adsorbent, and purity of the recovered phosphoric matter. Further, by discharging the liquid in the preceding process of the operation of replacing the liquid held in the reactor vessel, it is possible to control the influence of the ingredients of the liquid.

Further, the liquid supply is carried out by the upward flow after the liquid held in the reactor vessel is discharged, it is possible to control the influence of the remaining liquid held in the reactor vessel, i.e., it is possible to prevent the agent liquid from being lost by the passing liquid displacement operation of the remaining held liquid, prevent the impurities, and the like from being mixed, and maintain the efficiency of contact between the adsorbent and passed liquid ingredient to be effected by quickly eliminating the gas component remaining in the reactor vessel after the liquid discharge.

According to the water treatment equipment 1A of this embodiment, it is possible to reduce the consumption amount of the regeneration agent liquid while maintaining the effect thereof, and more appropriately carry out repetitive utilization of the phosphorus adsorbent, and hence it is possible to efficiently and appropriately carry out the operation of removing/recovering phosphorus from the wastewater.

According to the embodiments, it is possible to prevent the agent liquid consumption amount from excessively increasing while preventing the impurities in the water to be treated from being mixed, and recover phosphorus from the water to be treated.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A water treatment equipment comprising:
a phosphorus adsorbent which adsorbs phosphorus contained in water to be treated;
a reactor vessel including a packed bed which is filled with the phosphorus adsorbent;
an introduction path configured to introduce the water into the reactor vessel, and a discharge path configured to discharge, from the reactor vessel, the water from which phosphorus has been removed;
a first liquid passing mechanism configured to pass, through the packed bed in the reactor vessel as a downward flow, a phosphorus desorption agent liquid which desorbs phosphorus from the phosphorus adsorbent which has adsorbed phosphorus;
a phosphorus recovery mechanism configured to recover phosphate from the phosphorus desorption agent liquid passed by the first liquid passing mechanism;
a second liquid passing mechanism configured to pass and circulate, through the packed bed in the reactor vessel, a regeneration agent liquid which restores the phosphorus adsorptive capability of the phosphorus adsorbent;
a phosphorous desorption agent liquid discharge path configured to discharge the phosphorus desorption agent liquid from the reactor vessel; and
a regeneration agent liquid discharge path configured to discharge the regeneration agent liquid from the reactor vessel.

2. The water treatment equipment according to claim 1, further comprising a liquid supply mechanism configured to supply a reverse cleaning liquid to the reactor vessel as an upward flow after the water held in the reactor vessel is discharged.

3. The water treatment equipment according to claim 1, wherein the second liquid passing mechanism is configured to supply the regeneration agent liquid to the reactor vessel as an upward flow after the desorption agent liquid held in the reactor vessel is discharged.

4. The water treatment equipment according to claim 1, further comprising a circulation mechanism configured to circulate the discharged regeneration agent liquid to the reactor vessel and configured to reuse as part of regeneration agent liquid after the regeneration agent liquid held in the reactor vessel is discharged from the vessel.

5. The water treatment equipment according to claim 1, wherein the phosphate recovered from the desorption agent liquid passed through the packed bed of the phosphorus adsorbent is calcium phosphate, and the passed desorption agent liquid is brought into contact with a solid calcium phosphate by the phosphorus recovery mechanism.

6. The water treatment equipment according to claim 1, wherein the phosphorus recovery mechanism comprises a crystallization vessel in communication with the phosphorous desorption agent liquid discharge path, and a calcium compound-deriving material injection mechanism configured to inject solid or liquid calcium compound-deriving material into the crystallization vessel.

* * * * *